(12) United States Patent
Zint

(10) Patent No.: US 7,216,440 B2
(45) Date of Patent: May 15, 2007

(54) APPARATUS AND METHOD FOR GARMENT QUALITY CONTROL

(75) Inventor: Erna Zint, Hong Kong (CN)

(73) Assignee: CSI Industries, Bensalem, PA (US)

( * ) Notice: Subject to any disclaimer, the term of this patent is extended or adjusted under 35 U.S.C. 154(b) by 0 days.

(21) Appl. No.: 11/210,926

(22) Filed: Aug. 24, 2005

(65) Prior Publication Data

US 2007/0044338 A1    Mar. 1, 2007

(51) Int. Cl.
G01B 5/02    (2006.01)
(52) U.S. Cl. .............................. 33/806; 33/2 R; 33/812
(58) Field of Classification Search ................. 33/806, 33/812
See application file for complete search history.

(56) References Cited

U.S. PATENT DOCUMENTS

| | | | | |
|---|---|---|---|---|
| 1,237,045 A | * | 8/1917 | Nelson | 33/812 |
| 1,262,678 A | * | 4/1918 | Lapoint | 33/812 |
| 1,526,305 A | * | 2/1925 | Neumaier | 33/806 |
| 3,197,875 A | * | 8/1965 | D'Azzo | 33/512 |
| 3,345,748 A | * | 10/1967 | Snyder | 33/2 R |
| 4,843,720 A | * | 7/1989 | Kim | 33/812 |

* cited by examiner

Primary Examiner—Christopher W. Fulton
(74) Attorney, Agent, or Firm—Klehr, Harrison, Harvey, Branzburg & Ellers, LLP

(57) ABSTRACT

Apparatus and methods for determining a dimension of a portion of a garment are disclosed that preferably comprise a first member having a first gage end and a slide end, and a second member co-operatively engaged with the first member. The second member has a second gage end that has at least one scale. The apparatus has a locking device for locking the first and second members, such as a screw or wing nut passed through a pair of holes in registration. In preferred embodiments, the first and second gage ends extend from the first and second members respectively at a substantially right angle so they are substantially L-shaped. It is also preferred that the second member is made of a first layer and a second layer spaced away from the first layer, so the slide end passes between the first and second layers. Methods of determining a dimension of a portion of a garment using the invention comprise providing a device having a first gage end and a second gage end, and at least one scale on the first member, and then adjusting a distance between the first gage end and the second gage end. The adjusting step is preferably carried out by sliding the members relative to one another using a scale. A locking device secures the members from motion and the first and second gage ends are inserted into a garment.

16 Claims, 2 Drawing Sheets

APPARATUS AND METHOD FOR GARMENT QUALITY CONTROL

The present invention relates to measuring instruments, and more particularly to measuring instruments used to determine the conformance of garments to dimensional specifications.

BACKGROUND OF THE INVENTION

Measuring devices for ascertaining linear dimensions are well known and include prosaic items such as rules and scales, or even markings along a table edge. Somewhat more sophisticated are those devices in the prior art that include movable elements and a scale or dial, such as vernier calipers or micrometers. The scales on such devices can be engraved, analog dials or digital readouts.

A major use of measuring devices is the process of quality control. Most manufactured goods need to be manufactured within dimensional tolerances and the art and science of quality control requires constant data collection and checking and re-checking of conformance to specification. It is cumbersome and expensive, however, to supply inspectors with precision measuring instruments in a high volume production environment. Conversely, simple "measuring sticks" are often equally insufficient since they are imprecise and slow down the manufacturing process.

In particular, in the garment industry, it is important that as clothing articles are manufactured, critical dimensions are maintained. Obviously, these dimensions relate directly to the fit and drape of the clothing article and are crucial to the overall success of the manufactured line. In general, however, mass-production of clothing articles is high volume and has relatively low profit margins, constraining the ability for quality control to be carried out in the methodical and precise manner that might be undertaken for other goods. Moreover, garments are manufactured using relatively lower skilled labor and under widely varying conditions of heat and humidity.

None of the prior art devices provides a solution to the problem of measuring garment dimensions reliably yet inexpensively and efficiently. Therefore, there remains a long-felt yet unmet need for providing improved measuring devices for use in the garment industry. It would further be desirable to provide such improvements in a manner that permitted their application across a variety of situations and that permitted their implementation in a cost-effective manner.

SUMMARY OF THE INVENTION

Accordingly, it has now been found that these and other shortcomings of the prior art can be overcome by providing a device for determining a dimension of a portion of a garment comprising a first member having a first gage end extending from the first member, and a slide end and a second member co-operatively engage with said first member comprising a second gage end that has at least one scale, and a locking device for locking the first and second members, such as a screw or wing nut passed through a pair of holes in registration. Preferably, the device further comprises a plurality of locking holes in each of the first member and the second member, and in certain embodiments the plurality of holes is in registration with said scale. In other preferred embodiments, the scale is on the first member and in certain other embodiments there can be a plurality of scales. Most preferably, there are two scales that are in inches.

In certain preferred embodiments, the first and second gage ends extend from the first and second members respectively at a substantially right angle to render each of said first and second members substantially L-shaped. Additionally, it is also preferred that the second member comprises a first layer and a second layer spaced away from the first layer, wherein the slide end passes between said first layer and said second layer.

The present invention also relates to methods of determining a dimension of a portion of a garment by providing a device having a first member having a first gage end and a second member comprising having a second gage end and at least one scale on the first member and then adjusting a distance between the first gage end and the second gage end. The adjusting is preferable carried out by sliding the members relative to one another and also preferably entails using a scale, as described above. A locking device for locking the first and second members then secures them from motion and the first and second gage ends are inserted into a garment. Most preferably, the step of securing a locking device for locking the first and second members comprises inserting a locking member into a set of holes in registration between the first and second members.

DETAILED DESCRIPTION OF THE PREFERRED EMBODIMENTS

The implementation of the present invention is in several preferred embodiments, discussed below, along with several illustrative examples. The embodiments of the invention described below are provided for the purpose of understanding the invention and are not meant to be limiting.

The present invention is useful with a wide variety of applications. Typically, however, in preferred embodiments, the device is used for garment measuring, particularly to check garment waistbands and most particularly to check elasticized waistbands. The device described herein can be made of metal or any of a wide variety of plastics and polymeric materials. The construction and use of the device will be evident to those of skill in the art from the following description and the accompanying drawings that illustrate one preferred embodiment.

Figure 1:
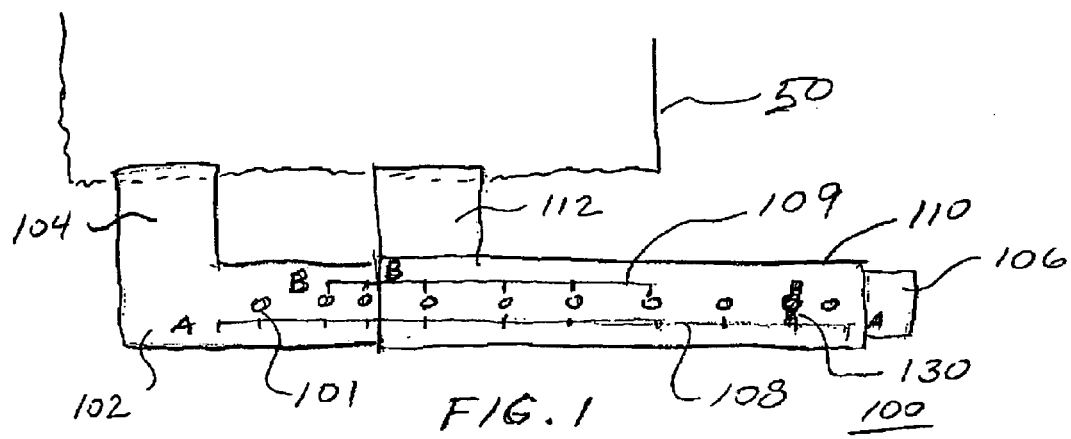
FIG. 1 is a top plan view of a measuring device made in accordance with the present invention.

Referring now to FIG. 1, a top plan view of a measuring device made in accordance with the present invention is illustrated. As seen in FIG. 1, in a preferred embodiment, the present invention comprises a device 100 for determining a dimension of a portion of a garment 50 that has a first member 102 that preferably has first gage end 104 extending from the first member 102 and a slide end 106. In preferred embodiments, the first member 102 has at least one scale 108, which is most preferably in inches or fractions of inches. there are two scales on the first member. Cooperating with the first member 102 is a second member 110 that engages or most preferably is in sliding engagement with the first member 102. The second member 110 also has a gage end 112. A locking device 130, for example a screw and a wing nut, for locking the first and second members is also provided. Preferably, but not necessarily, the locking device 130 engages a plurality of holes 101 within each member 102,110 when such holes 101 are in registration, and the holes themselves re registered or otherwise aligned with the scale 108. In certain embodiments, it will be preferable to construct this device 100 from a substantially translucent material.

Figure 2:
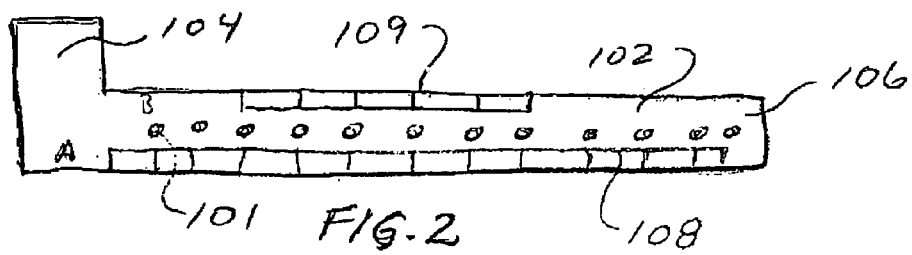
FIG. 2 is a top plan view of one section of the measuring device illustrated in FIG. 1.
Figure 3:
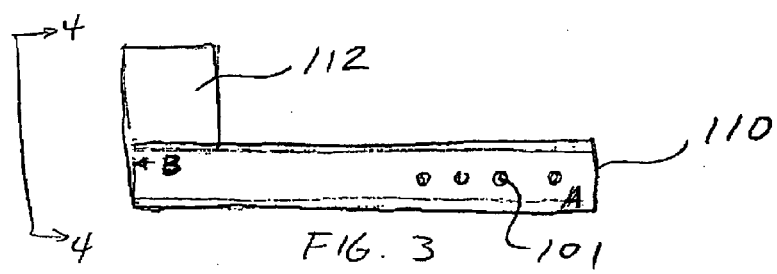
FIG. 3 is a top plan view of another section of the measuring device illustrated in FIG. 1.

Further details of the present invention are illustrated in FIGS. 2–3 which are, respectively, a top plan view of the first member 102 and second member 110 of the measuring device 100 illustrated in FIG. 1. In FIGS. 2–3, it can be seen that the first gage end 104 and second gage 112 each most preferably extend from the first and second members 102, 110 respectively at a substantially right angle to render each of said first and second members substantially L-shaped. As noted above, it is preferred that a scale 108 be visible on the first member 102, and in a most preferred embodiment such as that illustrated in FIG. 2, a second scale 109 is also provided.

Figure 4:
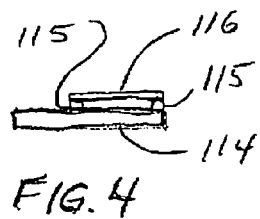
FIG. 4 is an end view of the section of the device illustrated in FIG. 3.
Figure 5:
FIG. 5 is a side elevation view of the section of the device illustrated in FIG. 3.

The construction details of the second member 110 are illustrated in FIGS. 4–5. FIG. 4 is an end view of the second member 110 that is illustrated in FIG. 3, while FIG. 5 is a side elevation view. In the preferred embodiment illustrated, the second member 110 comprises a first layer 114 and a second layer 116 spaced away from the first layer by edge spacers 115. This construction creates a passage that permits the slide end 106 of the first member to pass between said first and second layers 114,116.

Figure 6:
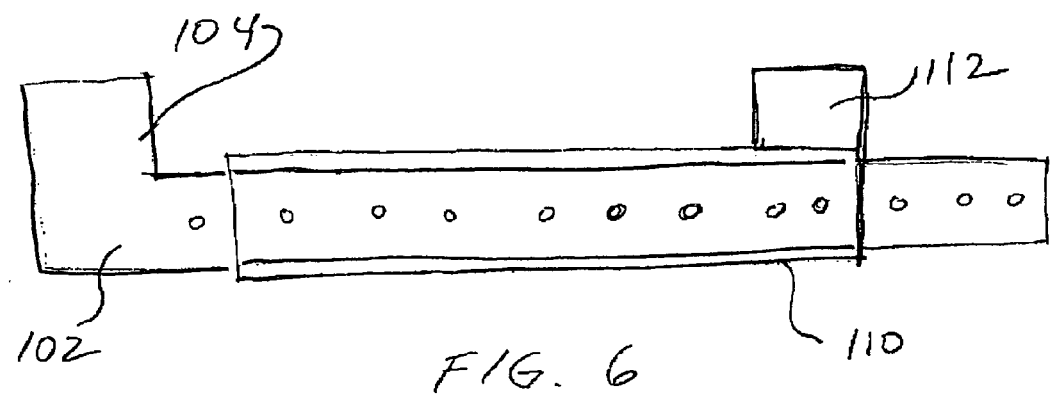
FIG. 6 is a top plan view of an alternate arrangement for the measuring device illustrated in FIG. 1.

Referring finally to FIG. 6, a top plan view of the device 100 illustrated in FIG. 1 is shown, but with the second member 110 reversed so that the second gage end 112 is at the opposite end, thereby permitting a much wider opening to be measured.

The present invention also relates to methods of determining a dimension of a portion of a garment. In accordance with the present invention a device is provided that has a first member having a first gage end and a second member comprising having a second gage end and at least one scale on the first member. The distance between the first gage end and the second gage end is adjusted, preferably by sliding the members relative to one another and by using a scale. The members are then secured via a locking device, preferably using pairs of holes in registration as described above. After the device is set up the first and second gage ends are inserted into a garment and the determination as to whether the dimension is within specification is made.

Upon review of the foregoing, numerous adaptations, modifications, and alterations will occur to the reviewer. These will all be, however, within the spirit of the present invention. Accordingly, reference should be made to the appended claims in order to ascertain the true scope of the present invention.

What is claimed is:

1. A device for determining a dimension of a portion of a garment comprising:
    a first member having a first gage end extending from the first member and a slide end;
    a second member co-operatively engaged with said first member comprising a second gage end;
    at least one scale; and
    a locking device for locking the first and second members that extends through one set of a plurality of sets of locking holes in each of the first member and the second member.

2. The device of claim 1, wherein the plurality of holes is in registration with said scale.

3. The device of claim 1, wherein the scale is on the first member.

4. The device of claim 1, comprising a plurality of scales.

5. The device of claim 1, wherein the scales are in inches.

6. The device of claim 4, wherein there are two scales on the first member.

7. The device of claim 1, wherein the device is constructed of a substantially translucent material.

8. The device of claim 1, the locking member is a screw and wing nut.

9. The device of claim 1 wherein the first and second gage ends extend from the first and second members respectively at a substantially right angle to render each of said first and second members substantially L-shaped.

10. The device of claim 1 wherein the second member comprises a first layer and a second layer spaced away from the first layer, wherein the slide end passes between said first layer and said second layer.

11. A device for determining a dimension of a portion of a garment comprising:
    a first member having a first gage end extending at a substantially right angle from the first member and a slide end;
    a second member comprising having a second gage end extending at a substantially right angle from the second member, and an opening for co-operatively and slidably engaging with said first member comprising a second gage end;
    at least one scale on the first member; and
    a locking device for locking the first and second members that extends through one set of a plurality of sets of locking holes in each of the first member and the second member.

12. The device of claim 11, comprising a first scale and second scale.

13. The device of claim 11, wherein the second member comprises a first layer and a second layer, and two edge spacers therebetween to create said opening.

14. A method of determining a dimension of a portion of a garment comprising:
    providing a device having a first member having a first gage end and a second member comprising having a second gage end and at least one scale on the first member;
    adjusting a distance between the first gage end and the second gage end;
    securing a locking device for locking the first and second members by extending the locking device through one set of a plurality of sets of locking holes in each of the first member and the second member; and
    inserting the first and second gage ends into a garment.

15. The method of claim 14 wherein the step of adjusting the distance comprises viewing a scale on the device.

16. The method of claim 14 wherein the step of adjusting comprises sliding the first member within the second member.

* * * * *